United States Patent [19]

Nakata et al.

[11] Patent Number: 4,971,423
[45] Date of Patent: Nov. 20, 1990

[54] GRADIENT-INDEX-TYPE OPTICAL DEVICE

[75] Inventors: Kohei Nakata, Yokohama; Seiichi Shingaki, Hadano; Takashi Serizawa, Sagamihara; Haruo Tomono, Kawasaki, all of Japan

[73] Assignee: Canon Kabushiki Kaisha, Tokyo, Japan

[21] Appl. No.: 200,858

[22] Filed: Jun. 1, 1988

[30] Foreign Application Priority Data

Jun. 2, 1987 [JP]  Japan ................................ 62-137716

[51] Int. Cl.$^5$ .............................................. G02B 6/18
[52] U.S. Cl. .................................. 350/96.31; 350/413
[58] Field of Search .................. 350/413, 96.18, 96.30, 350/96.31, 96.34

[56] References Cited

U.S. PATENT DOCUMENTS 3,941,474  3/1976  Kitano et al. .................. 350/96.31
4,799,761  1/1989  Yamamoto et al. .............. 350/96.31

FOREIGN PATENT DOCUMENTS 63-190732  8/1988  Japan .
1113229  5/1968  United Kingdom .

Primary Examiner—Frank Gonzalez
Attorney, Agent, or Firm—Fitzpatrick, Cella, Harper & Scinto

[57] ABSTRACT

A gradient index-type optical device is produced by the ion exchange process. First, a transparent dielectric body contacting an ion to be exchanged is provided with a light-absorbing portion containing also an ion to be exchanged and a coloring component at at least a part of the surface thereof. The transparent dielectric is soaked in or caused to contact a molten salt containing an ion providing a refracted index distribution for ion exchange. In the gradient index-transparent dielectric thus produced, the light-absorbing portion can have a refractive index continuous with that of the transparent dielectric body and a thermal expansion coefficient equal to or smaller than that of the transparent dielectric body, so that flare at the boundary and the stress fragility are alleviated. The optical device can also have a good size accuracy.

11 Claims, 4 Drawing Sheets

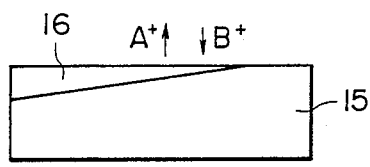
FIG. 12        FIG. 13
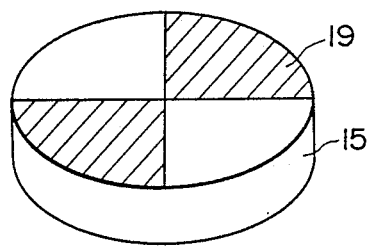
FIG. 14
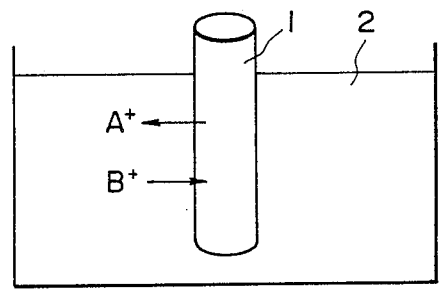
FIG. 15

GRADIENT-INDEX-TYPE OPTICAL DEVICE

FIELD OF THE INVENTION AND RELATED ART

The present invention relates to a gradient index-type optical device and a process for production thereof based on an ion exchange process wherein a transparent dielectric body is soaked in or caused to contact a molten salt containing an ion providing a gradient index or refractive index gradient to cause exchange between the ion in the molten salt and an ion in the transparent dielectric body thereby to form a gradient index in the transparent dielectric body.

There has been known an ion exchange process as described above for producing a gradient index-type optical device. For example, as shown in FIG. 15, a glass rod 1 containing a cation denoted by $A^+$ such as $Li^+$, $Tl^+$ or $Cs^+$ is soaked in a molten salt 2 such as sodium nitrate or potassium nitrate, so that the ion ($A^+$) in the glass is exchanged with the cation ($B^+$) in the molten salt to obtain a rod lens having a refractive index distribution as shown in FIG. 16. Further, it has been also known to roughen the outer surface of the rod lens and apply thereon a light-absorbing material having a higher refractive index than the rod lens, thereby reducing the flare of the lens (Tokko-Sho (JP-B) 50-37550, Tokkai-Sho (JP-A) 50-44844).

However, it is generally difficult to apply a light-absorbing material onto the circumference of a rod lens to obtain a constant outer diameter of the rod lens after the coating. In a rod lens array comprising a bundle of plural rod lenses, the respective rod lenses are required to have uniform optical characteristic and outer diameter, so that a lowering in accuracy of outer diameter during the application of a light-absorbing material around the rod lenses should be avoided and the improvement thereof has been desired.

Further, in case where a glass rod containing $Li^+$ is subjected to ion exchange in molten sodium nitrate for preparation of a rod lens according to the ion exchange process, there arises a problem that the peripheral portion of a lens is cause to have a large thermal expansion coefficient as shown in FIG. 17. A rod having such a distribution of thermal expansion coefficient is liable to be fragile in response to a stress, so that generation of cracks or breakage frequently occur during the use thereof. Further, in the case where the circumference of a rod lens is coated with a light-absorbing material having a higher refractive index than the rod lens for the purpose of preventing flare, a refractive index distribution as shown in FIG. 18 results so that another problem that Fresnel reflection increases at the boundary between the rod lens and the light-absorbing material.

SUMMARY OF THE INVENTION

An object of the present invention is to provide a gradient index-type optical device having a light-absorbing surface portion and yet having a high size accuracy.

Another object of the present invention is to provide a gradient index-type optical device having a light-absorbing surface portion and yet free of crack generation in the light-absorbing portion.

A further object of the present invention is to provide a gradient index-type optical device having a transparent core and a light-absorbing surface portion, which causes little reflection at the boundary between the transparent core and the light-absorbing surface portion and is free of flare.

A still further object of the present invention is to provide a process for effectively producing a gradient index-type optical device as described above.

A yet further of the invention is to provide a gradient index-type optical device having a three-dimensionally varying shape of the light-absorbing portion containing a coloring component and a process for production thereof.

According to the present invention, there is provided a gradient index-type optical device produced by the ion exchange process, comprising a transparent dielectric body having a refractive index distribution and a light-absorbing portion disposed on at least a part of the surface of the transparent dielectric body and comprising an ion introduced by ion exchange and a coloring component.

According to another aspect of the present invention, there is provided a process for producing a gradient index-type optical device according to the ion exchange process, which comprises:

providing a transparent dielectric body coating an ion to be exchanged with a light-absorbing portion containing an ion to be exchanged and a coloring component at at least a part of the surface of the transparent dielectric body, and causing the transparent dielectric to be soaked in or to contact a molten salt containing an ion providing a refractive index distribution, thereby to effect ion exchange.

The gradient index-type optical device is formed by subjecting a part of the optical device comprising a light-absorbing portion to ion-exchange. Accordingly, it is unnecessary to form a light-absorbing portion after the preparation of the gradient index-type optical device. Therefore, the optical device is free of a reduction in size accuracy caused by application of a light-absorbing material after preparation of a gradient index-type optical device. Further, the light-absorbing portion in the gradient index-type optical device has been obtained through ion-exchange similarly as the transparent dielectric core portion and is composed of a similar material as the transparent dielectric portion. As a result, it is easy to substantially equalize the refractive index of the light-absorbing portion and the refractive index of the transparent dielectric portion in the neighborhood of the boundary between both portions, so that the reflection at the boundary can be minimized. Even in the case where the transparent dielectric portion and the light-absorbing portion are composed of different types of materials, the refractive indexes of both portions can be equalized in the neighborhood of the boundary therebetween through appropriate selection of materials.

Further, by appropriately selecting the material for the light-absorbing portion, it is possible to set the thermal expansion coefficient of the light-absorbing portion to be substantially equal to or smaller than that of the transparent dielectric portion in the neighborhood of the boundary between both portions. By these measures, when the gradient index-type optical device is formed through cooling after the ion exchange, the core itself of the device shrinks toward the center so that a stress acting toward the center occurs to provide the resultant gradient index-type optical device with an improved mechanical strength.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 12 is a schematic view illustrating a glass body having a wedge-shaped light-absorbing portion according to Example 6;

FIG. 13 is a sectional view of an axial lens obtained by partial change in transmittance of Example 6;

FIG. 14 is an axial lens having sectorshaped light-absorbing portions according to modification of Example 6;

FIG. 15 is a schematic view for illustrating the principle of ion exchange;

DESCRIPTION OF THE PREFERRED EMBODIMENTS

The transparent dielectric body used in the present invention comprises a transparent dielectric material containing an ion to be ion-exchanged, i.e., an (ion-)exchangeable ion. Examples the material therefor may include optical glass and crystals such as $LiNbO_3$ and $LiTaO_5$, and various kinds of glass may generally be used suitably. The light-absorbing portion or material disposed in contact with the surface of the transparent dielectric body contains an exchangeable ion and a coloring component, and the ion-exchange reaction is effected through this portion to provide a refractive index distribution in the transparent dielectric body. The exchangeable ion may preferably be a cation, such as $Li^+$, $Na^+$, $K^+$, $Rb^+$, $Cs^+$, $Tl^+$ or $Ag^+$. The molten salt also contains an exchangeable ion which is different from the exchangeable ion in the transparent dielectric body but may preferably be selected from the same group of cations as described above. The exchangeable ion in the molten salt may particularly preferably be sodium or potassium.

The exchangeable ion contained in the light-absorbing portion and the exchangeable ion in the transparent dielectric body may be either the same or different. The exchangeable ion contained in the light-absorbing portion can also be the same as the exchangeable ion in the molten salt.

The light-absorbing portion has a light-absorbing function and functions to decrease flare light. More specifically, the light-absorbing portion may be composed of one or more kinds of glass containing a metal ion, such as that of Mn, Cr, Co, Ni, Fe, Cu, Ag, Ti, Pb, Ru, Cd, V or Mo as a coloring component.

According to the process of the invention, various gradient index-type optical devices having three-dimensionally varying light-absorbing portions can be easily obtained.

Figure 1:
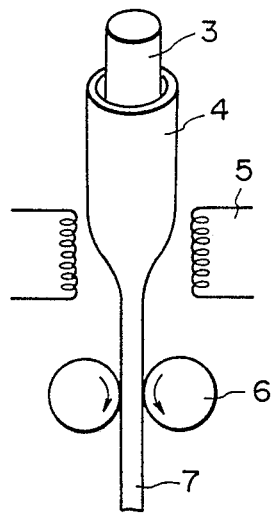
FIG. 1 is a schematic view illustrating a heat stretching step in Example 1.
Figure 3:
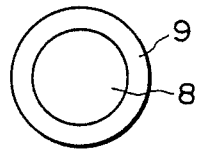
FIG. 3 is a sectional view of a double rod lens according to Example 1.

Hereinbelow, the present invention will be explained with reference to the drawings. FIGS. 1 and 3 illustrate an embodiment of the invention. More specifically, FIG. 3 shows a rod lens having a light-absorbing layer and FIG. 1 illustrates an embodiment of the process for producing the lens.

Referring to FIG. 1, a cylindrical light-absorbing glass 4 containing an exchangeable ion and a coloring component is disposed to encircle a rod core glass 3, and both are heated by an electric furnace 5 and drawn by pulling rollers 6 to provide a double glass rod 7 through melt integration of the core glass 3 and the light-absorbing glass 4. The double glass rod is cut into an appropriate length and soaked in a molten salt containing an exchangeable ion thereby to effect ion exchange between the exchangeable ion in the double glass rod and the exchangeable ion in the molten salt. The double rod after the ion exchange is formed into a rod lens comprising a transparent core 8 and a light-absorbing layer 9 surrounding the core 8 as shown in FIG. 3.

Figure 4:
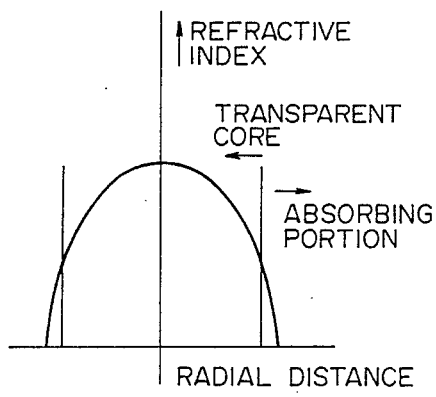
FIG. 4 is a graph showing the refractive index distribution of the rod lens according to Example 1.
Figure 5:
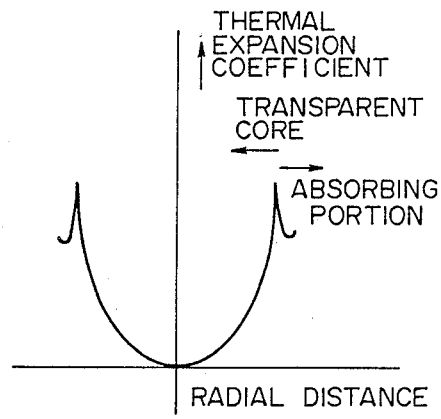
FIG. 5 is a graph showing the thermal expansion coefficient distribution of the rod lens according to Example 1.

The gradient index-type rod lens produced according to the process of the present invention through melt integration of a transparent dielectric body and a light-absorbing member is caused to have a refractive index distribution as shown in FIG. 4 and a distribution of thermal expansion coefficient as shown in FIG. 5.

Figure 18:
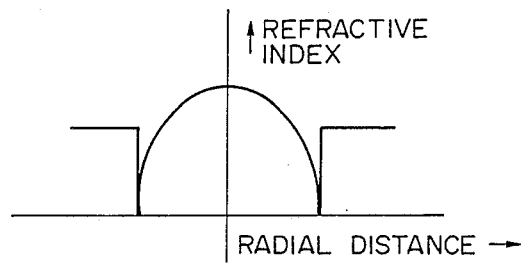
FIG. 18 is a graph showing a refractive index distribution of a rod lens coated with a light-absorbing material of prior art.

In this instance, it is possible to obtain a rod lens having a refractive index distribution as shown in FIG. 4 wherein the refractive index decreases substantially continuously from the center of the transparent core toward the circumference and provides substantially the same value (e.g., an refractive index different of 0.001 or less) at the boundary between the transparent core and the light-absorbing portion by controlling the amounts of the exchangeable ions or the amount of the coloring component in the transparent dielectric body and the light-absorbing member. The thus-obtained refractive index distribution of FIG. 4 is clearly different from the one shown in FIG. 18 obtained by the conventional process of application of a light-absorbing material. For example, the refractive index of the light-absorbing portion may be lowered by (1) decreasing $Li_2O$ and increasing $Na_2O$ instead or (2) decreasing $PbO$, $TiO_2$ or $ZrO_2$ in comparison with the content in the glass composition constituting the transparent core.

It is also possible to set the thermal expansion coefficient of the outer light-absorbing portion to be substantially equal to or smaller than that at the boundary between the transparent core and the light-absorbing portion as shown in FIG. 5. The thermal expansion coefficient of the light-absorbing portion may for example be lowered by (1) increasing $B_2O_3$ or $Al_2O_3$ or (2) increasing $SiO_2$ compared with that in the transparent core.

The rod lens having such distribution patterns with respect to refractive index and thermal expansion coefficient shows optical characteristics and strength which are much more excellent than those of the conventional rod lens. As a result, it is possible to omit steps of surface roughening for prevention of flare and application of a light-absorbing material after the ion exchange. Further, the accuracy of the outer diameter of the rod lens is ensured at a certain level in the step of melt integration of the transparent core and the light-absorbing member according to the invention, so that a level of outer diameter accuracy particularly required for preparation of a lens array can be obtained easily.

Figure 2:
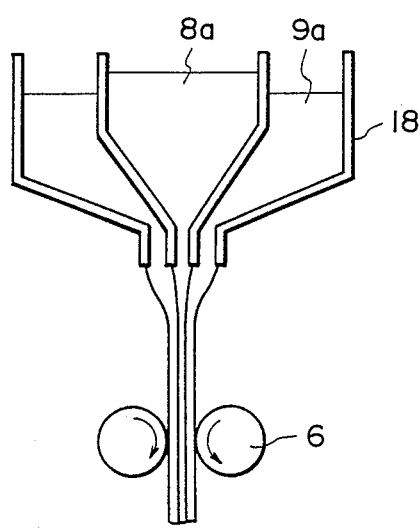
FIG. 2 is a sectional view of a doublewall crucible according to a modification of Example 1.

The melt integration of a transparent dielectric body and a light-absorbing material can also be effected in a manner as shown in FIG. 2 wherein the respective materials are heat-melted in a doublewalled crucible 18 so that a transparent dielectric material 8a is melted in an inner crucible, a light-absorbing material 9a containing an exchangeable ion and a coloring component is melted and both materials are respectively withdrawn through lower nozzles and pulling rollers 6 to produce a melt-integrated structure of both materials.

Further, if the shapes of the transparent dielectric body and the light-absorbing portion allow, it is possible to spray powdery glass containing a coloring component onto the core to cause hot fusion or to use a transparent dielectric body of a glass blank containing $Ag^+$ ion or $Pb^{++}$ ion and reduce the surface thereof with hydrogen to precipitate Ag or Pb, thus forming an integral light-absorbing layer.

Figure 11:
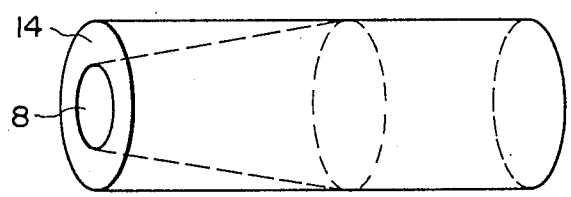
FIG. 11 is a schematic view of a conical core rod lens according to Example 5.
Figure 16:
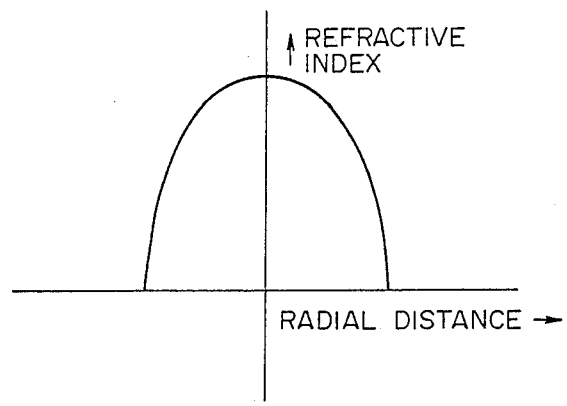
FIG. 16 is a graph showing a refractive index distribution of a rod lens of prior art.
Figure 17:
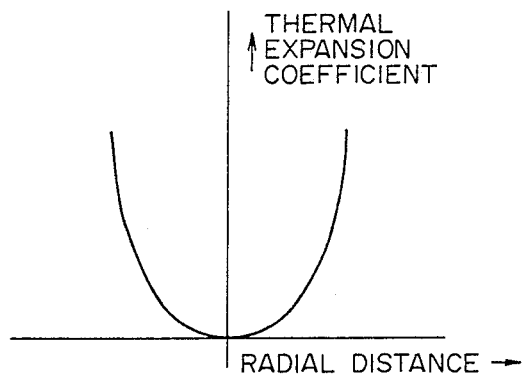
FIG. 17 is a graph showing a thermal expansion coefficient distribution of a rod lens of prior art.

FIGS. 11, 13 and 14 respectively show a gradient index-type lens having a special shape of light-absorbing portion containing a coloring component and subjected to ion exchange.

Hereinbelow, the present invention will be described more specifically based on Examples.

EXAMPLE 1

As shown in FIG. 1, a 30 mm diameter core glass 3 of a borosilicate glass of the following composition containing 20 mol. % of $SiO_2$ was provided.,

| Core glass composition (mol. %) | | | | | | | | |
|---|---|---|---|---|---|---|---|---|
| $Li_2O$ | $Na_2O$ | MgO | CaO | PbO | $B_2O_3$ | $Al_2O_3$ | $SiO_2$ | $TiO_2$ |
| 20.0 | 8.0 | 10.0 | 0.5 | 1.0 | 5.0 | 1.0 | 49.5 | 5.0 |

Around the core glass 3 was disposed a hollow cylindrical light-absorbing glass 4 having a thickness of 0.7 mm and comprising a borosilicate glass of the following composition containing 5 mol % of MnO as the coloring component.

| Light-absorbing glass composition (mol %) | | | | | | | | | |
|---|---|---|---|---|---|---|---|---|---|
| $Li_2O$ | $Na_2O$ | MgO | CaO | PbO | $B_2O_3$ | $Al_2O_3$ | $SiO_2$ | $TiO_2$ | MnO |
| 20.0 | 7.4 | 9.3 | 0.4 | 0.8 | 4.7 | 0.9 | 46.8 | 4.7 | 5.0 |

The core glass 3 and the light-absorbing glass 4 were fixed relative to each other, heated to 650° C. in an electric furnace 5 and stretched through pulling rollers 6 to provide a double glass rod 7 of 1 mm in diameter (core dia.=0.955 mm, light-absorbing layer thickness =0.022 mm) wherein the core glass and the light-absorbing glass were integrated through fusion.

The glass rod was cut into a length of 1 m and soaked in a molten bath of sodium nitrate to effect ion exchange between $Li^+$ ion in the glass rod and $Na^+$ ion in the molten salt. The glass rod after the ion exchange comprised a transparent core 8 having a refractive index distribution and a light-absorbing layer 9. The refractive index distribution and the distribution of thermal expansion coefficient of the glass and after the ion exchange are shown in FIGS. 4 and 5, respectively. The refractive index was identical at the boundary of the transparent core and the light-absorbing layer and decreased substantially continuously. The thermal expansion coefficient was identical to or even smaller in the light-absorbing layer compared with that of the transparent core at the boundary.

More specifically, the refractive indexes of the glass rod at respective parts with different radial distances were as shown in the following table.

| Refractive index $n_d$ | | |
|---|---|---|
| Radial distance (mm) | | $n_d$ |
| 0 | (center) | 1.588 |
| 0.478 | (boundary) | 1.569 |
| 0.5 | (outermost layer) | 1.568 |

On the other hand, the thermal expansion coefficients along the radial direction of the glass rod were as shown in the following table.

| Thermal expansion coefficient $\alpha$ | | |
|---|---|---|
| Radial distance (mm) | | $\alpha \times 10^7$ |
| 0 | (center) | 109.4 |
| 0.478 | (boundary) | 114.8 |
| 0.5 | (outermost layer) | 114.5 |

The thus obtained glass rod showed a good flare removal effect and an improved strength due to a a moderate caulking force exerted by the light-absorbing layer.

EXAMPLE 2

A rod lens was prepared in the same manner as in Example 1 by using a rod glass and a light-absorbing glass of the following compositions.

| Core glass composition (mol %) | | | | | | | | | |
|---|---|---|---|---|---|---|---|---|---|
| $Li_2O$ | $Na_2O$ | MgO | PbO | $B_2O_3$ | $Al_2O_3$ | $SiO_2$ | $TiO_2$ | $ZrO_2$ |
| 14.7 | 10.0 | 10.1 | 1.0 | 5.0 | 0.2 | 51.0 | 4.5 | 3.5 |

Light-absorbing glass composition: obtained by adding 3 mol of CoO to 100 mol of the core glass composition.

The refractive indexes ($n_d$) and thermal expansion coefficients ($\alpha$) of the rod lens measured along the radial distance from the center were as shown below.

| Radial distance (mm) | | $n_d$ | $\alpha \times 10^7$ |
| --- | --- | --- | --- |
| 0 | (center) | 1.60 | 112.5 |
| 0.478 | (boundary) | 1.581 | 118.0 |
| 0.5 | (outermost layer) | 1.580 | 117.7 |

EXAMPLE 3

Figure 6:
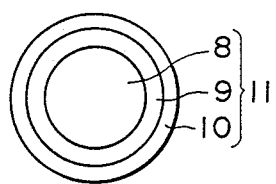
FIG. 6 is a sectional view of a triple rod lens according to Example 3.
Figure 7:
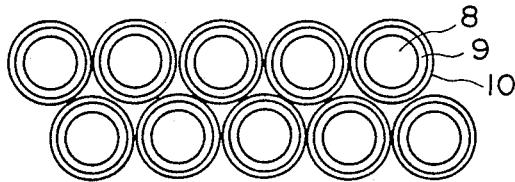
FIG. 7 is a sectional view showing an arrangement of triple rod lenses according to Example 3.
Figure 8:
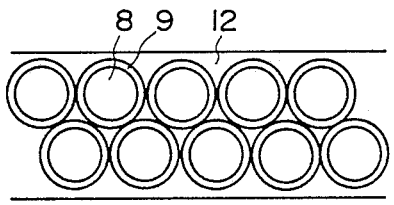
FIG. 8 is a sectional view of an integral lens assembly according to Example 3.

A triple rod lens 11 as shown in FIG. 6 was prepared by coating the rod lens prepared in Example 1 and comprising the transparent core 8 and the light-absorbing layer 9 with a second light-absorbing layer 10 of a glass composition obtained by adding a small amount of $B_2O_3$ as a softening point-lowering component to the light-absorbing glass composition (softening point=600° C.) giving the first light-absorbing layer 9 to provide a softening point of 590° C. A plurality of the triple rod lenses thus prepared were arranged as shown in FIG. 7 and heated to a temperature around the softening point of the second light-absorbing glass 10 under pressure.

As a result, the second light-absorbing layer 10 having a lower softening point was softened to fill the gaps among the double glass rod comprising a transparent core 8 and a light-absorbing layer 9, thus forming a gap-filling light-absorbing material. As a result, the resultant integral lens array formed a lens assembly of a wholly glassy substance showing a remarkably improved durability. Further, as the outer diameter accuracy of the unit rod lenses was good, the lens array showed a good optical characteristics.

EXAMPLE 4

Figure 9:
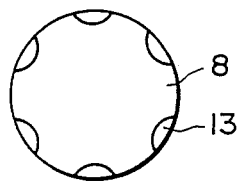
FIG. 9 is a sectional view of a rod lens having light-absorbing portions according to Example 4.
Figure 10:
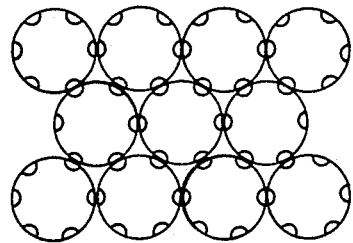
FIG. 10 is a sectional view showing an arrangement of rod lenses according to Example 4.

1 mm-dia. thin bars of light-absorbing glass containing Li as an exchangeable ion were disposed around a transparent glass core of 30 mm diameter at 6 positions dividing the circumference into 6 equal parts. The structure was heated and stretched similarly as in Example 1 to prepare a rod lens as shown in FIG. 9 comprising a transparent core 8 and local light-absorbing portions 13 embedded in parts of the periphery of the core. A plurality of the thus-prepared rod lenses were arranged so that they contacted each other at their light-absorbing portions, and they were fixed to each other with an adhesive to obtain a lens array as shown in FIG. 10. Such a lens array shows a preferentially enhanced light-absorbing effect at portions of contact between rod lenses where particularly effective flare-prevention effect is exhibited, so that it is suitably used for image transmission.

EXAMPLE 5

Referring to FIG. 11, a transparent conical glass core 8 containing Li as an exchangeable ion and a light-absorbing member 14 containing Li as an exchangeable ion and Co and Mn as coloring components, were respectively prepared by guiding and fitted to each other, followed by heat fusion for integration. The integrated body was subjected to ion exchange through the light-absorbing member in a molten salt of $NaNO_3$, whereby a rod lens having a unique conical shape and yet having an outer shape of a cylinder suitable for easy handling was obtained. Such a lens show a refractive index distribution and a distribution of thermal expansion coefficient as shown in FIGS. 4 and 5, respectively, and is suitably used for photocoupling.

EXAMPLE 6

Referring to FIG. 12, a transparent flat glass plate 15 having the same composition as the core glass in Example 1 and a wedge-shaped light-absorbing member 16 containing Li as an exchangeable ion and Co as a coloring component, were respectively prepared by grinding and integrated with each other through heat fusion. The integrated body was subjected to ion exchange through the light-absorbing member 16 in a molten salt of $NaNO_3$. After the ion exchange, the transparent member 15 was grounded into a spherical face to obtain an axial lens 17 having locally varying transmittances. Further, as shown in FIG. 14, a thin sector-shaped light-absorbing member 19 in place of the above wedge-shaped light-absorbing member 16 was applied by heat fusion to a transparent glass member, whereby an axial lens having locally different transmittances. These axial lenses are suitably used for optical switching.

What is claimed is:

1. A gradient index-type optical device that is produced by an ion exchange process using an external exchanging ion source, comprising:
    a transparent dielectric body comprising ions that have been exchanged and having a varying refractive index distribution, and
    a light-absorbing portion disposed on at least a part of a surface of the transparent dielectric body and comprising both an exchanging ion and a colorizing component;
    the exchanged ions within the transparent dielectric body having been introduced by ion exchange from the external exchanging ion source through the light-absorbing portion.

2. An optical device according to claim 1, wherein the light-absorbing portion has a thermal expansion coefficient which is substantially equal to that of the transparent dielectric body in the vicinity of the boundary with the light-absorbing portion.

3. An optical device according to claim 1, wherein the light-absorbing portion and the transparent dielectric body have substantially equal refractive indexes in the vicinity of the boundary therebetween.

4. An optical device according to claim 3, wherein the light-absorbing portion has a thermal expansion coefficient which is substantially equal to that of the transparent dielectric body in the vicinity of the boundary with the light-absorbing portion.

5. The optical device according to claim 1, wherein said transparent dielectric body contains at least one ion exchanged selected from the group consisting of $Li^+$, $Na^+$, $K^+$, $Rb^+$, $Cs^+$, $Tl^+$ and $Ag^+$.

6. The optical device according to claim 1, wherein said transparent dielectric body and said light-absorbing portion contain the same species of ion exchanged.

7. The optical device according to claim 1, wherein said transparent dielectric body and said light-absorbing portion contain different species of ion exchanged.

8. The optical device according to any one of claims 1-7, wherein said coloring component is at least one species selected from the group consisting of Mn, Cr, Co, Ni, Fe, Cu, Ag, Ti, Pb, Ru, Cd, V and Mo.

9. A gradient index-type optical device according to claim 1 produced by an ion exchange process, which comprises:
    providing a transparent dielectric body comprising ions to be exchanged with a light-absorbing portion that comprises both an ion to be exchanged and a coloring component, said light absorbing portion covering at least a part of the surface of the transparent dielectric body, and causing the transparent dielectric body to be in contact with a molten salt that comprises an exchanging ion capable of providing a varying refractive index, thereby to effect an ion exchange with said ions to be exchanged that passes through a light-absorbing portion.

10. An optical device according to claim 1, wherein the light-absorbing portion has a thermal expansion coefficient which is smaller than that of the transparent dielectric body in the vicinity of the boundary with the light-absorbing portion.

11. An optical device according to claim 3, wherein the light-absorbing portion has a thermal expansion coefficient which is smaller than that of the transparent dielectric body in the vicinity of the boundary with the light-absorbing portion.

* * * * *

UNITED STATES PATENT AND TRADEMARK OFFICE
CERTIFICATE OF CORRECTION

PATENT NO. : 4,971,423     Page 1 of 2
DATED : November 20, 1990
INVENTOR(S) : Nakata, et al.

It is certified that error appears in the above-identified patent and that said Letters Patent is hereby corrected as shown below:

Column 1:
    Line 19, "Cs+is" should read --Cs+ is--.
    Line 43, "cause" should read --caused--.

Column 2:
    Line 6, "further" should read --further object--.

Column 3:
    Line 54, "Examples the" should read --Examples--.

Column 5:
    Line 58, "(mol %)" should read --(mol. %)--.

UNITED STATES PATENT AND TRADEMARK OFFICE
CERTIFICATE OF CORRECTION

PATENT NO. : 4,971,423

DATED : November 20, 1990

INVENTOR(S) : Nakata, et al.

It is certified that error appears in the above-identified patent and that said Letters Patent is hereby corrected as shown below:

Column 6:

Line 40, "a" (second occurence) should be deleted.

Line 50, "(mol %)" should read --(mol. %)--.

Column 7:

Line 42, "tions13" should read --tions 13--.

Column 8:

Line 29, "coloriz" should read --color--.

Signed and Sealed this

Eleventh Day of August, 1992

Attest:

DOUGLAS B. COMER

Attesting Officer

Acting Commissioner of Patents and Trademarks